(12) United States Patent
Han et al.

(10) Patent No.: US 12,253,974 B2
(45) Date of Patent: Mar. 18, 2025

(54) METADATA PROCESSING METHOD AND APPARATUS, AND A COMPUTER-READABLE STORAGE MEDIUM

(71) Applicant: ZTE Corporation, Shenzhen (CN)

(72) Inventors: Yinjun Han, Shenzhen (CN); Bo Wang, Shenzhen (CN); Yaofeng Tu, Shenzhen (CN); Hong Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 402 days.

(21) Appl. No.: 17/623,346

(22) PCT Filed: Jun. 24, 2020

(86) PCT No.: PCT/CN2020/098244
§ 371 (c)(1),
(2) Date: Dec. 28, 2021

(87) PCT Pub. No.: WO2021/004295
PCT Pub. Date: Jan. 14, 2021

(65) Prior Publication Data
US 2022/0365905 A1   Nov. 17, 2022

(30) Foreign Application Priority Data
Jul. 5, 2019 (CN) .......................... 201910605081.0

(51) Int. Cl.
*G06F 16/16* (2019.01)
*G06F 16/13* (2019.01)
*G06F 16/182* (2019.01)

(52) U.S. Cl.
CPC .......... *G06F 16/164* (2019.01); *G06F 16/134* (2019.01); *G06F 16/182* (2019.01)

(58) Field of Classification Search
CPC ..... G06F 16/164; G06F 16/182; G06F 16/134
(Continued)

(56) References Cited

U.S. PATENT DOCUMENTS

| 2014/0188953 A1* | 7/2014 | Lin | ........................ G06F 16/183 707/827 |
|---|---|---|---|
| 2014/0237202 A1 | 8/2014 | Yamamoto | |

(Continued)

FOREIGN PATENT DOCUMENTS

| CN | 102521386 A | 6/2012 |
|---|---|---|
| CN | 103688257 A | 3/2014 |

(Continued)

OTHER PUBLICATIONS

International Search Report for corresponding application PCT/CN2020/098244 filed Jun. 24, 2020; Mail date Sep. 29, 2020.
(Continued)

*Primary Examiner* — Joshua Bullock
(74) *Attorney, Agent, or Firm* — CANTOR COLBURN LLP

(57) ABSTRACT

Provided are a metadata processing method and apparatus, and a computer-readable storage medium. In the metadata processing method, a management server obtains metadata to be processed, wherein the metadata to be processed includes a directory structure and file attributes; and according to a load condition of at least one first node for storing the file attributes and based on a rule that file attributes of a same directory are stored in a same first node, the management server stores, in the at least one first node, the file attributes of directories in the directory structure in a distributed manner.

18 Claims, 3 Drawing Sheets

(58) Field of Classification Search
USPC .......................................................... 707/822
See application file for complete search history.

(56) References Cited

U.S. PATENT DOCUMENTS

| | | | | |
|---|---|---|---|---|
| 2015/0277802 A1* | 10/2015 | Oikarinen | ............. | G06F 3/0689 |
| | | | | 711/114 |
| 2015/0277969 A1* | 10/2015 | Strauss | ................... | G06F 9/467 |
| | | | | 707/703 |
| 2015/0278243 A1* | 10/2015 | Vincent | ................ | G06F 16/182 |
| | | | | 707/634 |
| 2015/0278397 A1* | 10/2015 | Hendrickson | ....... | G06F 16/9024 |
| | | | | 707/798 |
| 2015/0280959 A1* | 10/2015 | Vincent | ................... | H04L 67/52 |
| | | | | 709/203 |
| 2024/0020278 A1* | 1/2024 | Sarfare | .................. | G06F 16/21 |

FOREIGN PATENT DOCUMENTS

| | | |
|---|---|---|
| CN | 104615598 A | 5/2015 |
| CN | 106874383 A | 6/2017 |
| WO | 2018019255 A | 2/2018 |
| WO | 2018058949 A1 | 4/2018 |

OTHER PUBLICATIONS

European Search Report for corresponding application EP20837037; Report dated Sep. 16, 2022.

* cited by examiner

METADATA PROCESSING METHOD AND APPARATUS, AND A COMPUTER-READABLE STORAGE MEDIUM

CROSS REFERENCE

This application is a National Stage Filing of the PCT International Application No. PCT/CN2020/098244 filed on Jun. 24, 2020, which claims priority to Chinese Application No. 201910605081.0 filed on Jul. 5, 2019, the entirety of which is herein incorporated by reference.

TECHNICAL FIELD

Embodiments of the present disclosure relate to the field of computer technologies, and in particular, to a metadata processing method and apparatus, and a computer-readable storage medium.

BACKGROUND

A distributed file system manages storage media such as disks distributed on various physical nodes by means of distributed software, and provides a Portable Operating System Interface of UNIX (POSIX) with a uniform standard or a Network File System (NFS) file interface service to the exterior of the distributed file system. A file system usually includes two parts: metadata and data, wherein the data is specific file content, and the metadata includes two parts: a first part being a directory structure, and a second part being file attributes including attributes such as a storage location, size, permission, and time of the file. The metadata is the core of a distributed file system, and the storage management efficiency of the metadata determines the access efficiency, storage capacity and storage performance of the distributed file system.

In the related art, the processing of the metadata is separately storing the metadata of the directory structure and the metadata of the file attributes, where the directory structure is stored in all nodes, while the file attributes are distributed in different nodes for storage.

However, in this metadata processing method, because the file attributes under the same directory may be distributed in different nodes, efficiency of subsequent processing performed by a distributed system on the metadata cannot be guaranteed.

SUMMARY

Embodiments of the present disclosure provide a metadata processing method, which can guarantee efficiency of subsequent processing performed by a distributed system on the metadata.

Some embodiments of the present disclosure provide a metadata processing method, including the following operations.

A management server obtains metadata to be processed, wherein the metadata to be processed includes a directory structure and file attributes.

According to a load condition of at least one first node for storing the file attributes and based on a rule that file attributes of a same directory are stored in a same first node, the management server stores, in the at least one first node, the file attributes of directories in the directory structure in a distributed manner.

Some embodiments of the present disclosure provide a management server, including:
an obtaining module, configured to obtain metadata to be processed, wherein the metadata to be processed includes a directory structure and file attributes; and
a processing module, configured to store, in the at least one first node according to a load condition of at least one first node for storing the file attributes and based on a rule that file attributes of a same directory are stored in a same first node, the file attributes of directories in the directory structure in a distributed manner.

Some embodiments of the present disclosure provide a metadata processing apparatus, including a processor and a memory, wherein the memory stores the following commands that are able to be executed by the processor:
obtaining metadata to be processed, wherein the metadata to be processed comprises a directory structure and file attributes; and
according to a load condition of at least one first node for storing the file attributes and based on a rule that file attributes of a same directory are stored in a same first node, storing, in the at least one first node, the file attributes of directories in the directory structure in a distributed manner.

Some embodiments of the present disclosure provide a computer-readable storage medium. The computer-readable storage medium stores a computer-executable command. The computer-executable command is used for executing the following operations:
obtaining metadata to be processed, wherein the metadata to be processed comprises a directory structure and file attributes; and
according to a load condition of at least one first node for storing the file attributes and based on a rule that file attributes of a same directory are stored in a same first node, storing, in the at least one first node, the file attributes of directories in the directory structure in a distributed manner.

Since file attributes of all directories in a directory structure are stored based on a rule that file attributes of a same directory are stored in a same first node, the files of the same directory can be stored in the same node, thus guaranteeing efficiency of subsequent processing performed by a distributed system on the metadata.

Additional features and advantages of embodiments of the present disclosure will be set forth in the description which follows, and in part will be obvious from the description, or may be learned by practice of embodiments of the present disclosure. The objects and other advantages of embodiments of the present disclosure can be realized and attained by the structure particularly provided in the description, claims and drawings.

BRIEF DESCRIPTION OF THE DRAWINGS

The accompanying drawings are used for providing a further understanding of the technical solutions of the embodiments of the present disclosure, constitute a part of the description, and are used for explaining the technical solutions of the embodiments of the present disclosure together with the embodiments of the present disclosure, but do not constitute a limitation on the technical solutions of the embodiments of the present disclosure.

DETAILED DESCRIPTION OF THE EMBODIMENTS

In order to make the objectives, technical solutions, and advantages of the embodiments of the present disclosure more comprehensible, the following describes the embodiments of the present disclosure in detail with reference to the accompanying drawings. It is important to note that the embodiments in the present disclosure and characteristics in the embodiments can be combined arbitrarily without conflicts.

Operations shown in the flowchart of the figures may be performed in a computer system such as a set of computer-executable instructions. Furthermore, although a logic sequence is shown in the flowchart, in some cases, the shown or described operations may be executed in a sequence different from that described here.

Figure 1:
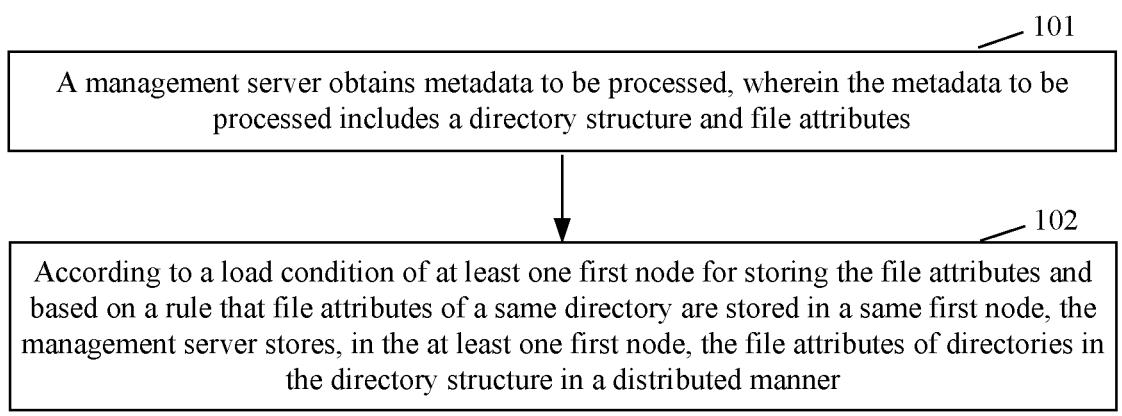
FIG. 1 is a schematic flowchart of a metadata processing method according to some embodiments of the present disclosure.

Some embodiments of the present disclosure provide a metadata processing method. As shown in FIG. 1, the metadata processing method includes the following operations 101 and 102 which are described in detail below.

At 101, a management server obtains metadata to be processed, wherein the metadata to be processed includes a directory structure and file attributes.

In some exemplary embodiments, a file attribute is attribute information for a file, including information such as the size, permission, time, copy, etc. of the file.

At 102, according to a load condition of at least one first node for storing the file attributes and based on a rule that file attributes of a same directory are stored in a same first node, the management server stores, in the at least one first node, the file attributes of directories in the directory structure in a distributed manner.

In some exemplary embodiments, distributed storage refers to storage satisfying the following conditions: I, file attributes of each directory are stored and only stored in one first node; and II, file attributes of any two or more directories may be stored in the same first node, or may not be stored in the same first node (specifically, where to store the file attributes is determined according to a load condition of each first node). It is assumed that file attributes of the directories include file attributes of a directory A, file attributes of a directory B and file attributes of a directory C, and the first nodes include a first node 1, a first node 2, a first node 3, a first node 4 and a first node 5, then the distributed storage formed may be as follows: the file attributes of the directory A are stored in the first node 1, the file attributes of the directory B are stored in the first node 3, and the file attributes of the directory C are stored in the first node 1.

In some exemplary embodiments, the management server performs the following processing on the file attributes of the same directory: obtaining a storage space required for storing the file attributes of the current directory, then obtaining a set of first nodes with a remaining storage space greater than the required storage space, obtaining a new set of first nodes with a load less than a first preset threshold value from the obtained set of first nodes, in a case where only one first node exists in the obtained new set of first nodes, storing the file attributes of the current directory in the first node; in a case where a plurality of first nodes exist in the obtained new set of first nodes, randomly selecting one first node from the new set of first nodes or selecting one first node with a minimum load from the new set of first nodes, and storing the file attributes of the current directory in the selected first node.

After the management server stores, in the at least one first node, the file attributes of directories in the directory structure in a distributed manner, the metadata processing method further includes operations which are described in detail below.

First, distributed storage information of the file attributes of the directories in the directory structure on the at least one first node is obtained.

Then, the directory structure and the obtained distributed storage information are stored in a second node.

In some exemplary embodiments, the distributed storage information is information about distributed storage of the file attributes of the directories in the directory structure in the first nodes. It is assumed that the file attributes of the directories include file attributes of a directory A, file attributes of a directory B and file attributes of a directory C, and the first nodes include a first node 1, a first node 2, a first node 3, a first node 4 and a first node 5. The distributed storage formed may be as follows: the file attributes of the directory A are stored in the first node 1, the file attributes of the directory B are stored in the first node 3, and the file attributes of the directory C are stored in the first node 1. Correspondingly, the distributed storage information may be: the file attributes of the directory A are stored in the first node 1, the file attributes of the directory B are stored in the first node 3, and the file attributes of the directory C are stored in the first node 1; alternatively, the distributed storage information may be as follows: the file attributes of the directory A and the file attributes of the directory C are stored in the first node 1, and the file attributes of the directory B are stored in the first node 3.

In some exemplary embodiments, since the file metadata information is distributed according to the directories, the files in the same directory are stored only in the same first node, thus having good locality. Moreover, because only the directory structure is stored in the second node and a large number of file attributes are distributed on a plurality of first nodes, the storage scale of the second node is very small, so that a single node can fully meet the requirement. In addition, there are not many file attributes stored in each first node, thereby achieving the effect of load balancing of metadata in multiple nodes.

In some exemplary embodiments, when an operation needs to be performed on the file attributes (for example, query of certain file attributes), the management server first obtains, on a second node according to the distributed storage information, a second node storing the file attributes to be operated, and then performs the corresponding operation on the file attributes in the obtained second node, thereby improving the operation efficiency of the file attributes.

In some exemplary embodiments, when a directory listing operation needs to be performed, the management server first obtains, in the second node, information of all subdirectories in a directory on which the directory listing operation is to be performed, obtains, according to the distributed storage information, the second node storing the file attributes of the directory on which the directory listing operation is to be performed, then obtains the corresponding file attributes on the obtained second node, and finally returns all the obtained subdirectory information and the obtained file attributes to a user requesting to perform the directory listing operation. Since the file attributes of all directories in the directory structure are stored based on a rule that file attributes of a same directory are stored in a same first node, the file attributes of the entire directory can be obtained only from one first node, thereby avoiding the tedious process of obtaining the file attributes from a plurality of nodes due to the fact that the file attributes are distributed in different nodes in the related art.

After the directory structure and the obtained distributed storage information are stored in a second node, the metadata processing method further includes operations which are described in detail as follows.

Directories other than a root directory are obtained from the directory structure, and following operations are performed for each obtained directory First, identification information of a parent directory of the obtained directory is obtained, and identification information is allocated to the obtained directory.

Then, identification information and location information of a first node storing file attributes of the obtained directory are obtained according to the distributed storage information.

After that, directory entry information is generated according to the obtained identification information of the parent directory, a name of the obtained directory, the identification information of the obtained directory, and the obtained identification information and location information of the first node.

In some exemplary embodiments, the directories other than the root directory are obtained from the directory structure sequentially from top to bottom in accordance with the hierarchy of the directory structure.

In some exemplary embodiments, after directories are obtained from top to bottom according to a hierarchy of the directory structure, the directory entry information is generated according to obtained directories. Since a directory is certainly a parent directory of a lower-level directory (unless there is no lower-level directory), fast searching for the directory entry information can be realized according to the identification information of the parent directory and the identification information of the directory. The reasons for the capability of fast searching can be confirmed from the following embodiments describing directory creation.

In some exemplary embodiments, all directory entry information generated is displayed in the form of a list.

Finally, the generated directory entry information is stored in the second node.

In some exemplary embodiments, since all directory entry information is stored in the second node, directory access, including directory moving, directory renaming, directory information checking, etc., can be implemented by accessing the second node. Meanwhile, because each piece of directory entry information generated according to the directories has unique identification information of the directory, when the directory name changes, the change of the identification information of the directory is not affected.

In some exemplary embodiments, the identification information allocated to a directory uniquely identifies the directory.

In some exemplary embodiments, identification information is first allocated to a root directory, and then a first directory at a lower level of the root directory is obtained and the following operations are performed for the directory: obtaining identification information of a parent directory of the directory (namely, identification information of the root directory); allocating identification information to the directory; generating directory entry information according to the obtained identification information of the parent directory, a name of the obtained directory, the identification information of the obtained directory, and the obtained identification information and location information of the first node; and storing the generated directory entry information in the second node. Next, a second directory (namely, a directory which is in the same level as the first directory at the lower level of the root directory in the directory structure) at this lower level of the root directory is obtained, and the second directory is processed according to the described method for processing the first directory at the lower level of the root directory until all the directories at the lower level of the root directory are processed. Next, a first directory at a level lower than the lower level of the root directory is obtained and the following operations are performed on the directory: obtaining identification information of a parent directory of the directory (namely, the identification information of the upper-level directory of the current directory, which has been allocated in the processing for the upper-level directory); allocating identification information to the directory; generating directory entry information according to the obtained identification information of the parent directory, a name of the obtained directory, the identification information of the obtained directory, and the obtained identification information and location information of the first node; and storing the generated directory entry information in the second node. Next, a second directory (namely, a directory which is in the same level as the first directory at the level lower than the lower level of the root directory in the directory structure) at a level lower than the lower level of the root directory is obtained, and the second directory is processed according to the described processing method for the first directory at level lower than the lower level of the root directory until all the directories at the level lower than the lower level of the root directory are processed. Directories at other levels are sequentially processed until the processing of all the directories in the directory structure is completed.

In some exemplary embodiments, after the generated directory entry information is stored in the second node, the metadata processing method further includes operations which are described in detail as follows.

File attributes allocated to each first node in the at least one first node are sequentially obtained according to the distributed storage information, and following operations are performed for the obtained file attributes allocated to each first node.

The following operations are sequentially performed for each obtained file attribute.

First, identification information of a parent directory of a directory to which the obtained file attribute belongs is obtained; a name of a file corresponding to the obtained file attribute is obtained; and identification information is allocated to the file corresponding to the obtained file attribute.

Then, a third node for storing the file corresponding to the obtained file attribute is selected according to a load condition of at least one third node for storing files, and identification information and location information of the selected third node are obtained.

In some exemplary embodiments, the management server performs the following processing on the file attributes of the obtained directory: obtaining a storage space required for storing files corresponding to the file attributes of the obtained directory, then obtaining a set of third nodes with a remaining storage space larger than the required storage space, obtaining a new set of third nodes with a load smaller than a second preset threshold in the obtained set of third nodes, in a case where only one third node exists in the obtained new set of third nodes, storing the files corresponding to the file attributes of the obtained directory on the third node, and in a case where a plurality of third nodes exist in the obtained new set of third nodes, randomly selecting one third node from the new set of third nodes or selecting one third node with a minimum load from the new set of third nodes, and storing the files corresponding to the file attributes of the obtained directory on the third node.

Then, file entry information is generated according to the obtained identification information of the parent directory, the obtained name of the file, the allocated identification information of the file, the obtained identification information and location information of the third node, and the obtained file attribute.

In some exemplary embodiments, all file entry information generated is displayed in the form of a list.

Finally, the generated file entry information is stored in the first node for storing the obtained file attribute.

In some exemplary embodiments, when a file operation needs to be performed, the management server first obtains, in the second node and according to distributed storage information, the second node storing the file attribute of the file to be operated, then obtains, on the obtained second node, the third node storing the file to be operated corresponding to the file attribute, and then performs the file operation in the obtained third node, thereby improving the operation efficiency of the file.

In some exemplary embodiments, other information (namely, the identification information of the parent directory, the name of the file, the identification information of the file, the identification information and the location information of the third node) in the file entry information except the file attribute may also be stored separately from the file attribute, and an association between the described other information and the file attribute may be implemented in a manner of a hard link.

In an embodiment example, for operations such as creating, writing and reading a file, the first node corresponding to the file parent directory can be directly accessed, thereby reducing the number of times of metadata interaction. Meanwhile, because the number of directories in the distributed file system is very large, distributed storage of the file metadata information in the plurality of second nodes according to the parent directory can effectively balance loads on the plurality of second nodes. Since file attributes are distributed according to the parent directories, and identification information and location information of the first nodes are stored in directory entry information of a second node, directory renaming and movement do not affect the distribution of metadata of a related file, and capacity expansion of the first node and capacity expansion of the third node do not affect the distribution of related data, and metadata and data migration do not need to be performed, so that the system has good expandability.

In some exemplary embodiments, each first node only stores file entry information corresponding to file attributes stored in the first node itself.

In some exemplary embodiments, after the generated directory entry information is stored in the second node, the metadata processing method further includes operations which are described in detail as follows, First, a name and path information of a first directory to be created are obtained from a client.

In some exemplary embodiments, the path information is the information indicating under which directory the creation is to be performed.

Next, whether the first directory has been created in the directory entry information stored in the second node is determined according to the path information of the first directory; in a case where the first directory has not been created, identification information of a parent directory of the first directory is obtained, identification information is allocated to the first directory, and a first node for storing file attributes of the first directory is selected according to the load condition of the at least one first node, and identification information and location information of the selected first node are obtained.

In some exemplary embodiments, it is assumed that the following directory structure exists. A root directory is an AnXin Group, and lower-level directories of the AnXin Group include: AnXin Investment, AnXin Securities and AnXin Bank. The lower-level directories of the AnXin Investment include: AnXin Investment Xian Division and AnXin Investment Beijing Division. The lower-level directories of the AnXin Securities include: AnXin Securities Xian Division and AnXin Securities Beijing Division. The lower-level directories of the AnXin Bank include: AnXin Bank Xian Division and AnXin Bank Beijing Division. Then, if a name to be created is AnXin Bank Nanjing Division, the path information is AnXin Group/AnXin Bank/AnXin Bank Nanjing Division.

In some exemplary embodiments, assuming that the path information is AnXin Group/AnXin Bank/AnXin Bank Nanjing Division, the process of determining whether the first directory has been created in the directory entry information stored in the second node according to the path information of the first directory includes: according to the path information, firstly finding out, in the directory entry information stored in the second node, whether there is directory entry information which contains identification information corresponding to a parent directory of AnXin Group and has a directory name of AnXin Bank; in a case where there is such directory entry information, obtaining the directory identification information in the directory entry information, then searching for directory identification information which contains a parent directory with identification information the same as the obtained directory identification information, and then checking whether there is directory entry information containing a directory name of "AnXin Bank Nanjing Division" in the found directory identification information.

Then, directory entry information is generated according to the obtained identification information of the parent directory, the obtained name of the first directory, the allocated identification information of the first directory, and the obtained identification information and location information of the first node.

Finally, the generated directory entry information is stored in the second node.

In some exemplary embodiments, after the generated directory entry information is stored in the second node, the metadata processing method further includes operations which are described in detail as follows.

First, an original name, path information and a desired name of a second directory, for which a directory name is to be modified, are obtained from a client.

Then, directory entry information of the second directory is obtained, according to the path information of the second directory, from the directory entry information stored in the second node.

In some exemplary embodiments, before directory entry information of the second directory is obtained, according to the path information of the second directory, from the directory entry information stored in the second node, the metadata processing method further includes: determining, according to the path information of the second directory, whether directory entry information of the second directory exists in the directory entry information stored in the second node.

Then, whether a directory name in the obtained directory entry information is the same as the obtained original name of the second directory is determined.

Finally, in a case where the directory name in the obtained directory entry information is the same as the obtained original name of the second directory, the directory name in the obtained directory entry information is modified from the original name of the second directory to the desired name.

In some exemplary embodiments, after the generated directory entry information is stored in the second node, the metadata processing method further includes operations which are described in detail as follows.

First, a name, original path information and desired path information of a third directory, for which a directory path is to be modified, are obtained from a client.

Then, directory entry information corresponding to the third directory is obtained, according to the original path information of the third directory, from the directory entry information stored in the second node; and the obtained directory entry information is deleted.

Finally, new directory entry information is created according to the name and the desired path information of the third directory, and the created new directory entry information is stored in the second node.

In some exemplary embodiments, the process of creating the new directory entry information according to the name and the desired path information of the third directory is similar to the process of creating the first directory according to the name and the path information of the first directory in the foregoing embodiments, and is not further described herein.

In some exemplary embodiments, after the generated file entry information is stored in the first node for storing the obtained file attribute, the metadata processing method further includes operations which are described in detail as follows.

Firstly, a name of a first file to be created and a name of a directory to which the first file belongs are obtained from a client.

Then, identification information of a parent directory of the directory to which the first file belongs and identification information and location information of a first node storing file attributes of the directory to which the first file belongs are obtained, according to the name of the directory to which the first file belongs, from the directory entry information stored in the second node.

After that, the first node corresponding to the obtained identification information of the first node is searched according to the obtained location information of the first node; and a file entry information location where the obtained identification information of the parent directory is located is obtained in the found first node.

Finally, a file with the name of the first file is created at the obtained file entry information location.

In some exemplary embodiments, after the generated file entry information is stored in the first node for storing the obtained file attribute, the metadata processing method further includes operations which are described in detail as follows.

Firstly, an original name and a desired name of a second file for which a name is to be modified and a name of a directory to which the second file belongs are obtained from a client.

Then, identification information of a parent directory of the directory to which the second file belongs and identification information and location information of a first node storing file attributes of the directory to which the second file belongs are obtained, according to the name of the directory to which the second file belongs, from the directory entry information stored in the second node.

After that, the first node corresponding to the obtained identification information of the first node is searched according to the obtained location information of the first node; a file entry information location where the obtained identification information of the parent directory is located is obtained in the found first node; and file entry information containing the original name of the second file is obtained at the obtained file entry information location.

Finally, the file name in the obtained file entry information is modified from the original name of the second file to the desired name.

In some exemplary embodiments, after the generated file entry information is stored in the first node for storing the obtained file attribute, the metadata processing method further includes operations which are described in detail as follows.

Firstly, a name and path information of a fourth directory for which a directory listing operation is to be performed are obtained from a client.

Then, directory entry information of all subdirectories of the fourth directory is obtained, according to the path information of the fourth directory, from the directory entry information stored in the second node, and identification information of a parent directory of the fourth directory and identification information and location information of a first node storing file attributes of the fourth directory are obtained.

After that, the first node corresponding to the obtained identification information of the first node is searched according to the obtained location information of the first node; a file entry information location where the obtained identification information of the parent directory is located is obtained in the found first node; and all file entry information of the fourth directory is obtained at the obtained file entry location.

Finally, the obtained directory entry information and the obtained file entry information are returned to the client.

In some exemplary embodiments, after the generated file entry information is stored in the first node for storing the obtained file attribute, the metadata processing method further includes operations which are described in detail as follows.

First, a name of a third file on which a file writing operation is to be performed, a name of a directory to which the third file belongs, and writing operation content are obtained from a client.

Next, identification information of a parent directory of the directory to which the third file belongs and identification information and location information of a first node storing file attributes of the directory to which the third file belongs are obtained, according to the name of the directory to which the third file belongs, from the directory entry information stored in the second node.

Then, the first node corresponding to the obtained identification information of the first node is searched according to the obtained location information of the first node; a file entry information location where the obtained identification information of the parent directory is located is obtained in the found first node; identification information and location information of a third node storing the third file are obtained at the obtained file entry information location; and the third node corresponding to the obtained identification information of the third node is searched according to the obtained location information of the third node.

Finally, a writing operation is performed in the third node corresponding to the obtained identification information of the third node according to the writing operation content of the third file; and file attributes are updated in the first node corresponding to the obtained identification information of the first node.

In some exemplary embodiments, after the generated file entry information is stored in the first node for storing the obtained file attribute, the metadata processing method further includes operations which are described in detail as follows.

Firstly, a name of a fourth file on which a file reading operation is to be performed and a name of a directory to which the fourth file belongs are obtained from a client.

Then, identification information of a parent directory of the directory to which the fourth file belongs and identification information and location information of a first node storing file attributes of the directory to which the fourth file belongs are obtained, according to the name of the directory to which the fourth file belongs, from the directory entry information stored in the second node.

Then, the first node corresponding to the obtained identification information of the first node is searched according to the obtained location information of the first node; a file entry information location where the obtained identification information of the parent directory is located is obtained in the found first node; and identification information and location information of a third node storing the fourth file are obtained at the obtained file entry information location.

Finally, the third node corresponding to the obtained identification information of the third node is searched according to the obtained location information of the third node; and a reading operation is performed in the obtained third node.

In some exemplary embodiments, the second node includes a Directory Tree Server (DTS).

In some exemplary embodiments, the first node includes a File Location Register (FLR).

In some exemplary embodiments, the third node includes a File Access Server (FAS).

In the metadata processing method provided in the embodiments of the present disclosure, since file attributes of all directories in a directory structure are stored based on a rule that file attributes of the same directory are stored in the same first node, the files of the same directory can be stored in the same node, and therefore, efficiency of subsequent processing performed by a distributed system on the metadata is guaranteed.

Figure 2:
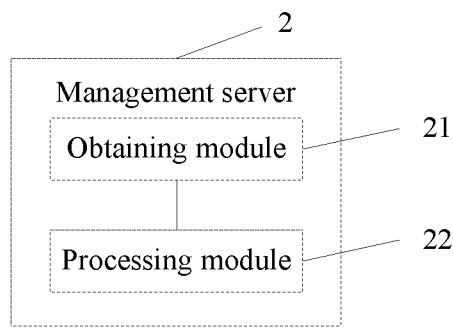
FIG. 2 is a schematic structural diagram of a management server according to some embodiments of the present disclosure.

Some embodiments of the present disclosure provide a management server. As shown in FIG. 2, the management server 2 includes an obtaining module 21 and a processing module 22.

The obtaining module 21 is configured to obtain metadata to be processed, wherein the metadata to be processed comprises a directory structure and file attributes.

And a processing module 22, configured to store, in the at least one first node according to a load condition of at least one first node for storing the file attributes and based on a rule that file attributes of a same directory are stored in a same first node, the file attributes of directories in the directory structure in a distributed manner.

In some exemplary embodiments, the obtaining module 21 is further configured to obtain distributed storage information of the file attributes of the directories in the directory structure on the at least one first node. The processing module 22 is further configured to store the directory structure and the obtained distributed storage information in a second node.

In some exemplary embodiments, the obtaining module 21 is further configured to:

According to a hierarchy of the directory structure, sequentially obtain directories other than a root directory from the directory structure from top to bottom, and perform the following operations for each obtained directory:

obtain identification information of a parent directory of the obtained directory;

allocate identification information to the obtained directory;

obtain, according to the distributed storage information, identification information and location information of a first node storing file attributes of the obtained directory;

generate directory entry information according to the obtained identification information of the parent directory, a name of the obtained directory, the identification information of the obtained directory, and the obtained identification information and location information of the first node; and store the generated directory entry information in the second node.

In some exemplary embodiments, the obtaining module 21 is further configured to sequentially obtain file attributes allocated to each first node in the at least one first node according to the distributed storage information, and perform following operations for the obtained file attributes allocated to each first node:

sequentially performing the following operations on each obtained file attribute:

sequentially performing following operations for each obtained file attribute:

obtaining identification information of a parent directory of a directory to which the obtained file attribute belongs;

obtaining a name of a file corresponding to the obtained file attribute;

allocating identification information to the file corresponding to the obtained file attribute;

selecting, according to a load condition of at least one third node for storing files, a third node for storing the file corresponding to the obtained file attribute, and obtaining identification information and location information of the selected third node;

generating file entry information according to the obtained identification information of the parent directory, the obtained name of the file, the allocated identification information of the file, the obtained identification information and location information of the third node, and the obtained file attribute; and storing the generated file entry information in the first node for storing the obtained file attribute.

In some exemplary embodiments, the obtaining module 21 is further configured to obtain, from a client, a name and path information of a first directory to be created. The processing module 22 is further configured to determine, according to the path information of the first directory, whether the first directory has been created in the directory entry information stored in the second node. The obtaining module 21 is further configured to obtain, in a case where the first directory has not been created, identification information of a parent directory of the first directory. The processing module 22 is further configured to allocate identification information to the first directory. The obtaining module 21 is further configured to select, according to the load condition of the at least one first node, a first node for storing file attributes of the first directory, and obtaining identification information and location information of the selected first node. The processing module 22 is further configured to generate directory entry information according to the obtained identification information of the parent directory, the obtained name of the first directory, the allocated identification information of the first directory, and the obtained identification information and location information of the first node; and store the generated directory entry information in the second node.

In some exemplary embodiments, the obtaining module 21 is further configured to sequentially obtain file attributes allocated to each first node in the at least one first node according to the distributed storage information, and perform following operations for the obtained file attributes allocated to each first node:
sequentially performing following operations for each obtained file attribute:
obtaining identification information of a parent directory of a directory to which the obtained file attribute belongs;
obtaining a name of a file corresponding to the obtained file attribute;
allocating identification information to the file corresponding to the obtained file attribute;
selecting, according to a load condition of at least one third node for storing files, a third node for storing the file corresponding to the obtained file attribute, and obtaining identification information and location information of the selected third node;
generating file entry information according to the obtained identification information of the parent directory, the obtained name of the file, the allocated identification information of the file, the obtained identification information and location information of the third node, and the obtained file attribute; and
storing the generated file entry information in the first node for storing the obtained file attribute.

In some exemplary embodiments, the obtaining module 21 is further configured to obtain, from a client, a name and path information of a first directory to be created. The processing module 22 is further configured to determine, according to the path information of the first directory, whether the first directory has been created in the directory entry information stored in the second node. The obtaining module 21 is further configured to obtain, in a case where the first directory has not been created, identification information of a parent directory of the first directory. The processing module 22 is further configured to allocate identification information to the first directory, generate directory entry information according to the obtained identification information of the parent directory, the obtained name of the first directory, the allocated identification information of the first directory, and the obtained identification information and location information of the first node, and store the generated directory entry information in the second node.

In some exemplary embodiments, the obtaining module 21 is further configured to obtain, from a client, an original name, path information and a desired name of a second directory, for which a directory name is to be modified. The processing module 22 is further configured to obtain, according to the path information of the second directory, directory entry information of the second directory from the directory entry information stored in the second node; determining whether a directory name in the obtained directory entry information is the same as the obtained original name of the second directory; and in a case where the directory name in the obtained directory entry information is the same as the obtained original name of the second directory, modify the directory name in the obtained directory entry information from the original name of the second directory to the desired name.

In some exemplary embodiments, the obtaining module 21 is further configured to obtain, from a client, a name, original path information and desired path information of a third directory, for which a directory path is to be modified; and obtain, according to the original path information of the third directory, directory entry information corresponding to the third directory from the directory entry information stored in the second node. The processing module 22 is further configured to delete the obtained directory entry information, and create new directory entry information according to the name and the desired path information of the third directory, and storing the created new directory entry information in the second node.

In some exemplary embodiments, the obtaining module 21 is further configured to obtain, from a client, a name of a first file to be created and a name of a directory to which the first file belongs, and obtain, from the directory entry information stored in the second node and according to the name of the directory to which the first file belongs, identification information of a parent directory of the directory to which the first file belongs and identification information and location information of a first node storing file attributes of the directory to which the first file belongs. The processing module 22 is further configured to search for the first node corresponding to the obtained identification information of the first node according to the obtained location information of the first node. The obtaining module 21 is further configured to obtain, in the found first node, a file entry information location where the obtained identification information of the parent directory is located; and obtain file entry information containing the original name of the second file at the obtained file entry information location. The processing module 22 is further configured to modify the file name in the obtained file entry information from an original name of the second file to the desired name.

In some exemplary embodiments, the obtaining module 21 is further configured to obtain, from a client, a name and path information of a fourth directory for which a directory listing operation is to be performed, obtain, from the directory entry information stored in the second node and according to the path information of the fourth directory, directory entry information of all subdirectories of the fourth directory, and obtain identification information of a parent directory of the fourth directory and identification information and location information of a first node storing file attributes of the fourth directory. The processing module 22 is further configured to search for the first node corresponding to the obtained identification information of the first node according to the obtained location information of the first node. The obtaining module 21 is further configured to obtain, in the found first node, a file entry information location where the obtained identification information of the parent directory is located, and obtain all file entry information of the fourth directory at the obtained file entry location. The processing module 22 is further configured to return the obtained directory entry information and the obtained file entry information to the client.

In some exemplary embodiments, the obtaining module 21 is further configured to obtain, from a client, a name of a third file on which a file writing operation is to be performed, a name of a directory to which the third file belongs, and writing operation content; and obtaining, from the directory entry information stored in the second node and according to the name of the directory to which the third file belongs, identification information of a parent directory of the directory to which the third file belongs and identification information and location information of a first node storing file attributes of the directory to which the third file belongs. The processing module 22 is further configured to search for the first node corresponding to the obtained identification information of the first node according to the obtained location information of the first node. The obtaining module 21 is further configured to obtain, in the found first node, a file entry information location where the obtained identification information of the parent directory is located; and obtain, at the obtained file entry information location, identification information and location information of a third node storing the third file. The processing module 22 is further configured to search for the third node corresponding to the obtained identification information of the third node according to the obtained location information of the third node; perform a writing operation in the third node corresponding to the obtained identification information of the third node according to the writing operation content of the third file; and update file attributes in the first node corresponding to the obtained identification information of the first node.

In some exemplary embodiments, the obtaining module 21 is further configured to obtain, from a client, a name of a fourth file on which a file reading operation is to be performed and a name of a directory to which the fourth file belongs; and obtaining, from the directory entry information stored in the second node and according to the name of the directory to which the fourth file belongs, identification information of a parent directory of the directory to which the fourth file belongs and identification information and location information of a first node storing file attributes of the directory to which the fourth file belongs. The processing module 22 is further configured to search for the first node corresponding to the obtained identification information of the first node according to the obtained location information of the first node. The obtaining module 21 is further configured to obtain, in the found first node, a file entry information location where the obtained identification information of the parent directory is located; and obtain, at the obtained file entry information location, identification information and location information of a third node storing the fourth file. The processing module 22 is further configured to search for the third node corresponding to the obtained identification information of the third node according to the obtained location information of the third node, and perform a reading operation in the obtained third node.

In some exemplary embodiments, the second node includes a DTS.

In some exemplary embodiments, the first node includes a FLR.

In some exemplary embodiments, the third node includes a FAS.

According to the management server provided in the embodiments of the present disclosure, since file attributes of all directories in a directory structure are stored based on a rule that file attributes of the same directory are stored in the same first node, the files of the same directory can be stored in the same node, and therefore the efficiency of subsequent processing performed by a distributed system on the metadata is guaranteed.

In practical applications, the obtaining module 21 and the processing module 22 are located in a Central Processing Unit (CPU), a Micro Processor Unit (MPU), a Digital Signal Processor (DSP), a Field Programmable Gate Array (FPGA), or the like in a management server.

The embodiments of the present disclosure also provide a metadata processing apparatus. The apparatus includes a memory, a processor, and a computer program stored in the memory and executable on the processor. When the processor executes the computer program, the metadata processing method in any one of the foregoing embodiments is implemented.

Some embodiments of the present disclosure provide a computer-readable storage medium. A computer-executable command is stored in the computer-readable storage medium, and the computer-executable command is used for executing any metadata processing method in the foregoing embodiments.

Figure 3:
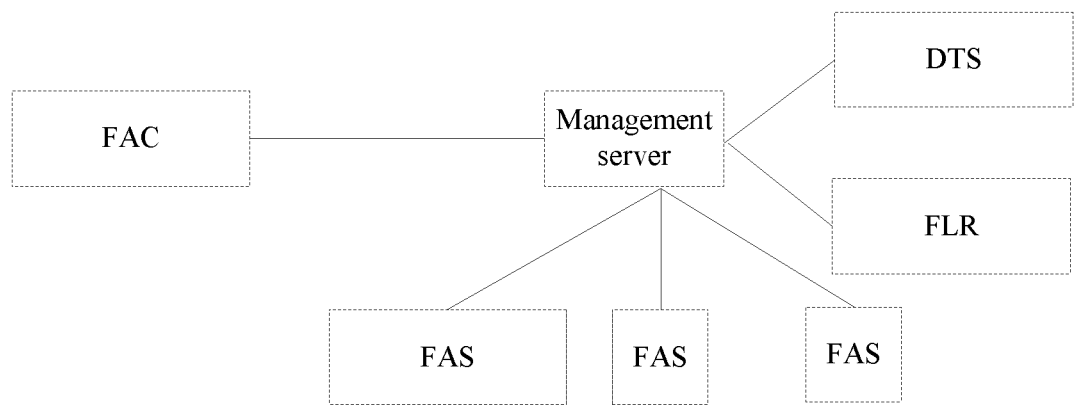
FIG. 3 is a schematic structural diagram of a metadata processing system according to some embodiments of the present disclosure.

In some exemplary embodiments, as shown in FIG. 3, the client may be a File Access Client (FAC), the second node may be a DTS, the first node may be an FLR, and the third node may be a FAS.

Figure 4:
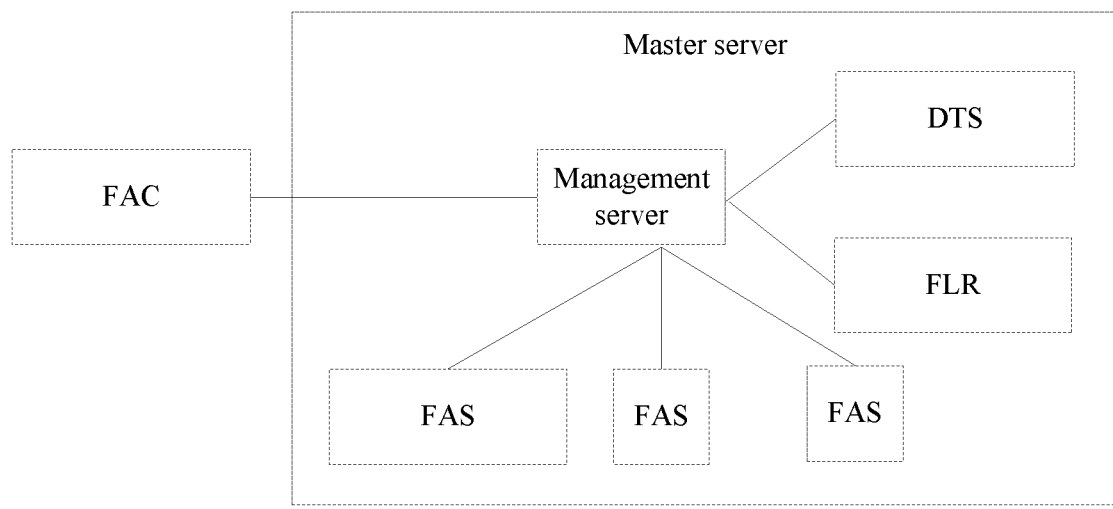
FIG. 4 is a schematic structural diagram of another metadata processing system according to some embodiments of the present disclosure.

Some embodiments of the present disclosure provide a metadata processing system. As shown in FIG. 4, the metadata processing system includes a client and a main server. The main server includes the described management server, DTS, FAS and at least one FLR.

The metadata processing system provided in the embodiments of the present disclosure provides a distributed file system metadata management solution with high capacity, high performance, high reliability and complete functions, solves the problems in large-scale metadata management in a distributed file system, such as directory renaming, directory listing, and load balancing in a case where file metadata attributes are distributed in multiple nodes, and enables the metadata management of the distributed file system to have good consistency in directory structure management, high concurrency with low latency, and good locality in directory listing while having good distribution in file attribute management.

Since the location information of all file metadata is stored in the directory entry information of a parent directory, when the FLR node is subjected to capacity expansion, the distribution of related metadata is not affected, and re-balancing of metadata is not required. Meanwhile, because the location information of the file data is stored in the FLR node, when the data node FAS is subjected to capacity expansion, file data relocation and rebalance are not required. Hence, compared with metadata and data distribution of a distributed file system under HASH distribution, the embodiments of the present disclosure do not require any migration of file metadata and data, thereby achieving seamless expansion.

Although the embodiments disclosed in the embodiments of the present disclosure are described above, the described contents are only embodiments used for facilitating understanding of the embodiments of the present disclosure, and are not intended to limit the embodiments of the present disclosure. Those having ordinary skill in the art can make various modifications and variations to the embodiments of the present disclosure without departing from the scope of the present disclosure. The scope of the present disclosure is defined by the appended claims.

INDUSTRIAL APPLICABILITY

Since file attributes of all directories in a directory structure are stored based on a rule that file attributes of a same directory are stored in a same first node, the files of the same directory can be stored in the same node, thus guaranteeing efficiency of subsequent processing performed by a distributed system on the metadata.

What is claimed is:

1. A metadata processing method, comprising:
obtaining, by a management server connected with at least one first node, a second node and at least one third node, metadata to be processed, wherein the metadata to be processed comprises a directory structure and file attributes;
according to a load condition of the at least one first node for storing the file attributes and based on a rule that file attributes corresponding to files of a same directory are stored in a same first node, storing, in a first node by the management server, the file attributes corresponding to files of directories in the directory structure, or storing, in first nodes by the management server, the file attributes corresponding to files of directories in the directory structure in a distributed manner; wherein each of the first node or first nodes in which the file attributes are stored has a remaining storage space greater than a storage space required for storing the file attributes corresponding to files of a corresponding directory, and has a load less than a first preset threshold value;
obtaining, by the management server, distributed storage information of the file attributes corresponding to the files of the directories in the directory structure on the first node or first nodes, and storing, by the management server, the directory structure and the obtained distributed storage information in the second node; and
storing, by the management server, the files of the directories in the directory structure in the at least one third node; and
obtaining, by the management server, directories other than a root directory from the directory structure, and performing following operations for each obtained directory: obtaining, by the management server, identification information of a parent directory of the obtained directory; allocating, by the management server, identification information to the obtained directory; obtaining, by the management server, according to the distributed storage information, identification information and location information of a first node storing file attributes corresponding to files of the obtained directory; generating, by the management server, directory entry information according to the obtained identification information of the parent directory, a name of the obtained directory, the identification information of the obtained directory, and the obtained identification information and location information of the first node; and storing, by the management server, the generated directory entry information in the second node.

2. The metadata processing method according to claim 1, wherein after storing the generated directory entry information in the second node, the metadata processing method further comprises:
sequentially obtaining file attributes allocated to each first node in the at least one first node according to the distributed storage information, and performing following operations for the obtained file attributes allocated to each first node:
sequentially performing following operations for each obtained file attribute:
obtaining identification information of a parent directory of a directory to which the obtained file attribute belongs;
obtaining a name of a file corresponding to the obtained file attribute;
allocating identification information to the file corresponding to the obtained file attribute;
selecting, according to a load condition of the at least one third node for storing files, a third node for storing the file corresponding to the obtained file attribute, and obtaining identification information and location information of the selected third node;
generating file entry information according to the obtained identification information of the parent directory, the obtained name of the file, the allocated identification information of the file, the obtained identification information and location information of the third node, and the obtained file attribute; and
storing the generated file entry information in the first node for storing the obtained file attribute.

3. The metadata processing method according to claim 2, wherein after storing the generated file entry information in the first node for storing the obtained file attribute, the metadata processing method further comprises:
obtaining, from a client, a name of a first file to be created and a name of a directory to which the first file belongs;
obtaining, from the directory entry information stored in the second node and according to the name of the directory to which the first file belongs, identification information of a parent directory of the directory to which the first file belongs and identification information and location information of a first node storing file attributes corresponding to files of the directory to which the first file belongs;
searching for the first node corresponding to the obtained identification information of the first node according to the obtained location information of the first node;
obtaining, in a found first node, a file entry information location where the obtained identification information of the parent directory is located; and
creating a file with the name of the first file at the obtained file entry information location.

4. The metadata processing method according to claim 2, wherein after storing the generated file entry information in the first node for storing the obtained file attribute, the metadata processing method further comprises:
obtaining, from a client, an original name and a desired name of a second file for which a name is to be modified and a name of a directory to which the second file belongs;
obtaining, from the directory entry information stored in the second node and according to the name of the directory to which the second file belongs, identification information of a parent directory of the directory to which the second file belongs and identification information and location information of a first node storing file attributes corresponding to files of the directory to which the second file belongs;

searching for the first node corresponding to the obtained identification information of the first node according to the obtained location information of the first node;

obtaining, in the found first node, a file entry information location where the obtained identification information of the parent directory is located;

obtaining file entry information containing the original name of the second file at the obtained file entry information location; and modifying a file name in the obtained file entry information from the original name of the second file to the desired name.

5. The metadata processing method according to claim 2, wherein after storing the generated file entry information in the first node for storing the obtained file attribute, the metadata processing method further comprises:

obtaining, from a client, a name and path information of a fourth directory for which a directory listing operation is to be performed;

obtaining, from the directory entry information stored in the second node and according to the path information of the fourth directory, directory entry information of all subdirectories of the fourth directory, and obtaining identification information of a parent directory of the fourth directory and identification information and location information of a first node storing file attributes corresponding to files of the fourth directory;

searching for the first node corresponding to the obtained identification information of the first node according to the obtained location information of the first node;

obtaining, in the found first node, a file entry information location where the obtained identification information of the parent directory is located;

obtaining all file entry information of the fourth directory at the obtained file entry location; and returning the obtained directory entry information and the obtained file entry information to the client.

6. The metadata processing method according to claim 2, wherein after storing the generated file entry information in the first node for storing the obtained file attribute, the metadata processing method further comprises:

obtaining, from a client, a name of a third file on which a file writing operation is to be performed, a name of a directory to which the third file belongs, and writing operation content;

obtaining, from the directory entry information stored in the second node and according to the name of the directory to which the third file belongs, identification information of a parent directory of the directory to which the third file belongs and identification information and location information of a first node storing file attributes corresponding to files of the directory to which the third file belongs;

searching for the first node corresponding to the obtained identification information of the first node according to the obtained location information of the first node;

obtaining, in the found first node, a file entry information location where the obtained identification information of the parent directory is located;

obtaining, at the obtained file entry information location, identification information and location information of a third node storing the third file;

searching for the third node corresponding to the obtained identification information of the third node according to the obtained location information of the third node;

performing a writing operation in the third node corresponding to the obtained identification information of the third node according to the writing operation content of the third file; and updating file attributes in the first node corresponding to the obtained identification information of the first node.

7. The metadata processing method according to claim 2, wherein after storing the generated file entry information in the first node for storing the obtained file attribute, the metadata processing method further comprises:

obtaining, from a client, a name of a fourth file on which a file reading operation is to be performed and a name of a directory to which the fourth file belongs;

obtaining, from the directory entry information stored in the second node and according to the name of the directory to which the fourth file belongs, identification information of a parent directory of the directory to which the fourth file belongs and identification information and location information of a first node storing file attributes corresponding to files of the directory to which the fourth file belongs;

searching for the first node corresponding to the obtained identification information of the first node according to the obtained location information of the first node;

obtaining, in the found first node, a file entry information location where the obtained identification information of the parent directory is located;

obtaining, at the obtained file entry information location, identification information and location information of a third node storing the fourth file;

searching for the third node corresponding to the obtained identification information of the third node according to the obtained location information of the third node; and performing a reading operation in the obtained third node.

8. The metadata processing method according to claim 2, wherein the third node comprises a File Access Server (FAS).

9. The metadata processing method according to claim 1, wherein after storing the generated directory entry information in the second node, the metadata processing method further comprises:

obtaining, from a client, a name and path information of a first directory to be created;

determining, according to the path information of the first directory, whether the first directory has been created in the directory entry information stored in the second node;

in a case where the first directory has not been created, obtaining identification information of a parent directory of the first directory;

allocating identification information to the first directory;

selecting, according to the load condition of the at least one first node, a first node for storing file attributes corresponding to files of the first directory, and obtaining identification information and location information of the selected first node;

generating directory entry information according to the obtained identification information of the parent directory, the obtained name of the first directory, the allocated identification information of the first directory, and the obtained identification information and location information of the first node; and storing the generated directory entry information in the second node.

10. The metadata processing method according to claim 1, wherein after storing the generated directory entry information in the second node, the metadata processing method further comprises:
 obtaining, from a client, an original name, path information and a desired name of a second directory, for which a directory name is to be modified;
 obtaining, according to the path information of the second directory, directory entry information of the second directory from the directory entry information stored in the second node;
 determining whether a directory name in the obtained directory entry information is the same as the obtained original name of the second directory; and
 in a case where the directory name in the obtained directory entry information is the same as the obtained original name of the second directory, modifying the directory name in the obtained directory entry information from the original name of the second directory to the desired name.

11. The metadata processing method according to claim 1, wherein after storing the generated directory entry information in the second node, the metadata processing method further comprises:
 obtaining, from a client, a name, original path information and desired path information of a third directory, for which a directory path is to be modified;
 obtaining, according to the original path information of the third directory, directory entry information corresponding to the third directory from the directory entry information stored in the second node;
 deleting the obtained directory entry information; and
 creating new directory entry information according to the name and the desired path information of the third directory, and storing the created new directory entry information in the second node.

12. The metadata processing method according to claim 1, wherein the second node comprises a Directory Tree Server (DTS).

13. The metadata processing method according to claim 1, wherein the first node comprises a File Location Register (FLR).

14. The metadata processing method according to claim 1, wherein according to a load condition of the at least one first node for storing the file attributes and based on a rule that file attributes corresponding to files of a same directory are stored in a same first node, storing, in a first node by the management server, the file attributes corresponding to files of directories in the directory structure, or storing, in first nodes by the management server, the file attributes corresponding to files of directories in the directory structure in a distributed manner comprises performing following processing on the file attributes corresponding to files of the same directory:
 obtaining a storage space required for storing the file attributes corresponding to files of current directory, then obtaining a set of first nodes with a remaining storage space greater than the required storage space, obtaining a new set of first nodes with a load less than a first preset threshold value from the obtained set of first nodes, in a case where only one first node exists in the obtained new set of first nodes, storing the file attributes corresponding to files of the current directory in the first node; in a case where a plurality of first nodes exist in the obtained new set of first nodes, randomly selecting one first node from the new set of first nodes or selecting one first node with a minimum load from the new set of first nodes, and storing the file attributes corresponding to files of the current directory in the selected first node.

15. The metadata processing method according to claim 1, wherein the distributed storage information is information about distributed storage of the file attributes corresponding to files of the directories in the directory structure in the at least one first node.

16. The metadata processing method according to claim 1, wherein all directory entry information generated is displayed in the form of a list.

17. A management server connected with at least one first node, a second node and at least one third node, and comprising a memory storing instructions and a processor in communication with the memory, wherein the processor is configured to execute the instructions to:
 obtain metadata to be processed, wherein the metadata to be processed comprises a directory structure and file attributes; and
 according to a load condition of the at least one first node for storing the file attributes and based on a rule that file attributes corresponding to files of a same directory are stored in a same first node, store, in a first node, the file attributes corresponding to files of directories in the directory structure, or store, in first nodes, the file attributes corresponding to files of directories in the directory structure in a distributed manner; wherein each of the first node or first nodes in which the file attributes are stored has a remaining storage space greater than a storage space required for storing the file attributes corresponding to files of a corresponding directory, and has a load less than a first preset threshold value;
 obtain distributed storage information of the file attributes corresponding to the files of the directories in the directory structure on the first node or first nodes, and store the directory structure and the obtained distributed storage information in the second node; and store the files of the directories in the directory structure in the at least one third node; and
 obtain directories other than a root directory from the directory structure, and perform following operations for each obtained directory: obtain identification information of a parent directory of the obtained directory; allocate identification information to the obtained directory; obtain according to the distributed storage information, identification information and location information of a first node storing file attributes corresponding to files of the obtained directory; generate directory entry information according to the obtained identification information of the parent directory, a name of the obtained directory, the identification information of the obtained directory, and the obtained identification information and location information of the first node; and store the generated directory entry information in the second node.

18. A non-transitory computer-readable storage medium, wherein a computer-executable command is stored in the computer-readable storage medium, and the computer-executable command is used to cause a management server connected with at least one first node, a second node and at least one third node to execute following operations:
 obtaining metadata to be processed, wherein the metadata to be processed comprises a directory structure and file attributes; and
 according to a load condition of the at least one first node for storing the file attributes and based on a rule that file attributes corresponding to files of a same directory are stored in a same first node, storing, in a first node, the file attributes corresponding to files of directories in the directory structure, or storing, in first nodes, the file attributes corresponding to files of directories in the directory structure in a distributed manner; wherein each of the first node or first nodes in which the file attributes are stored has a remaining storage space greater than a storage space required for storing the file attributes corresponding to files of a corresponding directory, and has a load less than a first preset threshold value;

obtaining distributed storage information of the file attributes corresponding to the files of the directories in the directory structure on the first node or first nodes, and storing the directory structure and the obtained distributed storage information in the second node; and storing the files of the directories in the directory structure in the at least one third node; and obtaining directories other than a root directory from the directory structure, and performing following operations for each obtained directory: obtaining identification information of a parent directory of the obtained directory; allocating identification information to the obtained directory; obtaining according to the distributed storage information, identification information and location information of a first node storing file attributes corresponding to files of the obtained directory; generating directory entry information according to the obtained identification information of the parent directory, a name of the obtained directory, the identification information of the obtained directory, and the obtained identification information and location information of the first node; and storing the generated directory entry information in the second node.

* * * * *